United States Patent [19]

Kläy

[11] 4,265,607
[45] May 5, 1981

[54] APPARATUS FOR MANUFACTURING A PLASTIC INSULATOR EQUIPPED WITH HELICAL-SHAPED SHIELDS

[76] Inventor: Hans Kläy, CH-1171 Bougy-Villars, Switzerland

[21] Appl. No.: 118,758

[22] Filed: Feb. 5, 1980

[30] Foreign Application Priority Data

Feb. 16, 1979 [DE] Fed. Rep. of Germany ....... 2905874

[51] Int. Cl.³ .......................... B29C 23/00; B29D 9/00; B29D 31/00
[52] U.S. Cl. ..................................... 425/113; 425/115; 425/127; 425/329; 425/335; 425/363; 425/366; 425/376 B; 425/471
[58] Field of Search ................ 425/115, 403, 366, 113, 425/127, 329, 335, 363, 459, 471, 376 B; 264/259

[56] References Cited
U.S. PATENT DOCUMENTS 3,679,344  7/1972  Ballint .................................. 425/366

Primary Examiner—W. E. Hoag
Attorney, Agent, or Firm—O'Brien and Marks

[57] ABSTRACT

An apparatus for fabricating a plastic insulator having helical-shaped shields or screens, these shields radially protruding from an insulator rod. Two oppositely rotating rolls coact to form an infeed gap for the material forming the shields which is infed in a kneadable condition in transverse direction to the rolls. According to a first embodiment drive means serve to rotate the rolls about their axes and the insulator rod about its lengthwise axis. Means provide relative mutual movement of the pair of rolls and the insulator rod in the direction of the lengthwise axis of the insulator rod or parallel thereto, in order to simultaneously form the shield and apply the same to the insulator rod. According to a further embodiment both of the rolls have peripheral grooves and these rolls, with the exception of such peripheral grooves, bear against one another at their outer surfaces, and drive means serve for rotating the rolls for forming a shield or screen rod.

4 Claims, 4 Drawing Figures

APPARATUS FOR MANUFACTURING A PLASTIC INSULATOR EQUIPPED WITH HELICAL-SHAPED SHIELDS

BACKGROUND OF THE INVENTION

The present invention relates to a new and improved construction of apparatus for fabricating a plastic insulator equipped with helical-shaped screens or shields, these shields radially protruding from an insulator rod.

At overhead lines for the transmission of voltages greater than 220 kV, for instance in a range of 500 to 700 kV, there are required insulators of several meters length and there arise tensile loads of at least 10 tons. For reasons of fabrication porcelain insulators can only be manufactured with a length of maximum about 2 meters. Therefore, for the previously mentioned transmission voltages there are required plastic insulators. These plastic insulators are presently composed of different elements. Typically, for instance, there is employed an insulator rod of desired length as a support element, upon which there is applied, according to different techniques, a protective device against weather or atmospheric conditions which is formed of "TEFLON" or silicon rubber. The insulator rod consists of a glass fiber-synthetic resin mixture. The previously mentioned weather protective device constitutes a protective coating which is provided with a number of shields or screens located along the insulator rod and surrounding the same. These shields therefore radially protrude from the insulator rod and fulfil the purpose of deflecting rain, in order to increase the leakage path along the insulator. As mentioned, the weather protective device and the screens can be applied in different ways to the insulator rod. Thus, it is known to slip over the insulator rod tubular-shaped sleeves containing thereat flange-like mounted screens or shields and to adhesively bond such with the insulator rod. However, each sleeve which is slipped over the insulator rod also can support a number of shields. It is also possible to individually attach the shields or screens at the insulator rod, after such has previously been covered with a protective coating or layer.

The previously mentioned fabrication procedures require a discontinuous manufacturing process. If individual sleeves are used, then they must be fabricated individually or in groups in presses while working at high pressures and temperatures. Plastic insulators of this type are known to the art from French Pat. application No. 2,363,170. An improvement in the plastic insulators can already be obtained if there is realized a continuous manufacturing procedure. Such improved plastic insulator is known to the art from German Pat. No. 1,190,072. Yet, this lastmentioned patent does not disclose how it is possible to economically fabricate such plastic insulator.

SUMMARY OF THE INVENTION

Therefore, it is a primary object of the present invention to provide a new and improved construction of apparatus for fabricating a plastic insulator equipped with helical-shaped shields in a manner not afflicted with the aforementioned drawbacks and limitations of the prior art proposals.

Another and more specific object of the present invention is directed to a new and improved construction of apparatus of the character described which enables manufacturing such type plastic insulators in a continuous fashion and through the use of simple means, and thus, economically.

Now in order to implement these and still further objects of the invention, which will become more readily apparent as the description proceeds, the inventive apparatus, according to a first embodiment thereof, is manifested by the features that there are provided at least two oppositely rotating truncated conical-shaped rolls. These rolls form therebetween and the outer surface of the neighboring insulator rod an infeed gap for the shield-forming material which is infed in a kneadable condition in transverse direction with respect to the rolls. This pair of rolls is arranged at one side of the insulator rod and the imaginary cone apexes of the rolls are located at the lengthwise axis of the insulator rod. Drive elements or drive means are provided for rotating the rolls about their axes and for rotating the insulator rod about its axis. Also, there is provided a device for the relative mutual movement of the roll pair and the insulator rod in the direction of the lengthwise axis of the insulator rod or essentially parallel thereto, in order to simultaneously form the shield or screen and for applying the shield to the insulator rod.

With the aforementioned apparatus the shields or screens are simultaneously fabricated and applied to the insulator rod or the like.

However, it is also possible to fabricate during a continuous working operation only a shield or screen rod, which then is present as a semimanufactured or intermediate product and then in a separate working operation is continuously secured to an existing insulator rod, in order to thereby form the screens or shields.

Hence, according to a second embodiment of inventive apparatus there are provided two oppositely rotating truncated conical-shaped rolls. Each of the outer or jacket surfaces of these rolls is provided with a respective circumferential or peripheral groove which collectively form an infeed gap for the shield-forming material which is infed in a kneadable condition in transverse direction to the rolls. Both of the rolls, with the exception of their circumferential or peripheral grooves, bear against one another at their outer surfaces and are provided with drive elements or drive means for rotating the rolls in order to form a shield rod.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a side view of a first embodiment of apparatus for simultaneously forming the helical-shaped shields or screens and for the application of the shields at an insulator rod or the like;

DETAILED DESCRIPTION OF THE PREFERRED EMBODIMENTS

Figure 1:
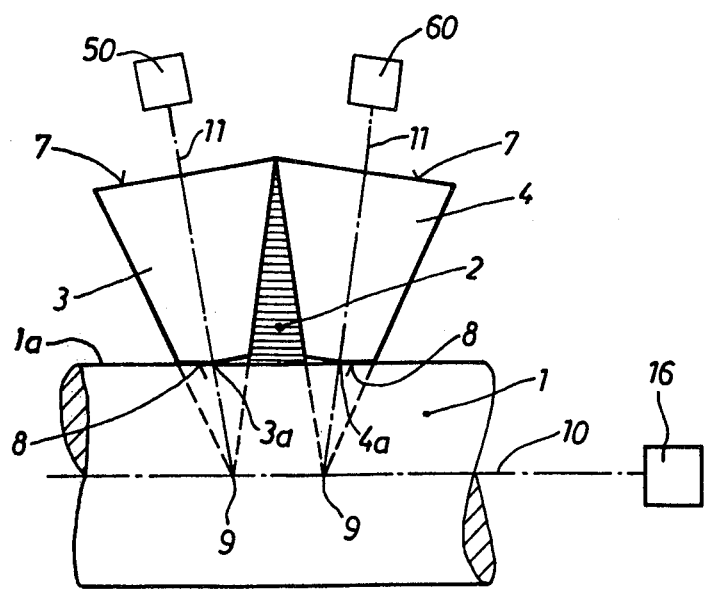

Describing now the drawings, it is to be understood that there are illustrated schematically therein two different embodiments of apparatus for fabricating a plastic insulator equipped with shields or screens and working in accordance with two different methods. In the disclosure to follow there will be initially discussed the apparatus shown in FIGS. 1 to 3. By means of this apparatus it is possible to provide, during a continuous working method, an insulator rod 1 or the like continuously with a shield helix 2. By referring to FIG. 1 it will be seen that such equipment has two oppositely rotating substantially truncated conical-shaped rolls or rollers 3 and 4, and the direction of rotation of the rolls 2 and 3 has been indicated in FIG. 2 by the arrows. These rolls 2 and 3 can be driven by any suitable drive means 50 and 60, respectively. The rolls 3 and 4 form therebetween and the outer surface 1a of the insulator rod 1 an infeed gap 5 for a shield-forming insulation material 6, here in the form of a suitable plastic and may be, for instance, the well known plastic material "TEFLON" or silicon rubber. Each roll 3 and 4 has end surfaces 7 and 8. The end surfaces 8 of the rolls 3 and 4, which are located at the region of the insulator rod 1, need not be planar or flat, rather can form a flat apex or tip, generally indicated by reference characters 3a and 4a, respectively, and the purpose of which will be explained more fully hereinafter. The imaginary apex 9 of each truncated conical-shaped roll 3 and 4 is located substantially at the lengthwise axis 10 of the insulator rod 1. Furthermore, both of the rolls 3 and 4, constituting a pair of rolls, are located to one side of the insulator rod 1.

Figure 2:
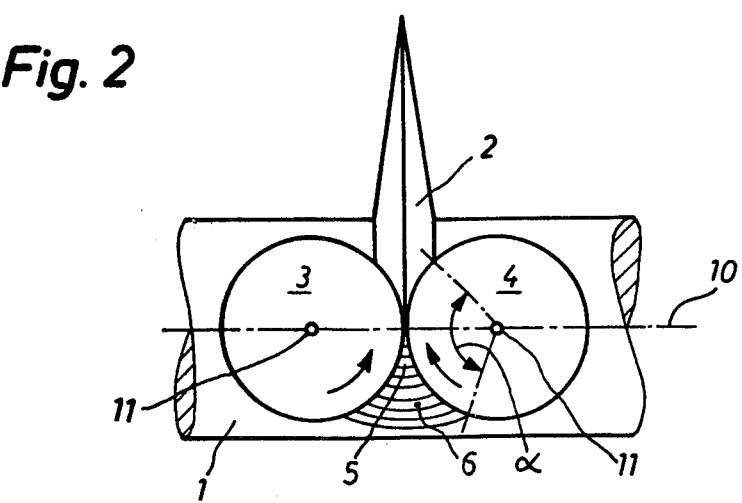
FIG. 2 is a top plan view of the apparatus of FIG. 1, showing a portion of a formed shield.
Figure 3:
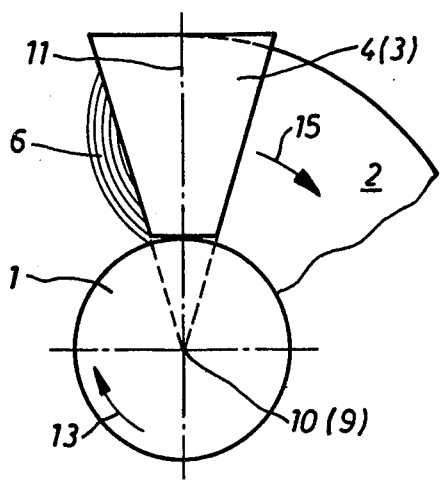
FIG. 3 is a side view of the apparatus of FIG. 1, showing in end view the insulator rod and part of the shield helix which is carried by such insulator rod.

From the showing of FIGS. 2 and 3 it will be apparent that the lengthwise axes 11 of the rolls 3 and 4 are arranged behind one another in the lengthwise extent of the insulator rod 1. From the illustration in FIG. 1 it will be seen that the lengthwise axes 11 of the rolls 3 and 4 converge in the direction of the lengthwise or longitudinal axis 10 of the insulator rod 1. There is also provided a conventional drive device 16 for the drive of the insulator rod 1. By means of this drive device 16 it is possible to rotate the insulator rod 1 about its lengthwise axis 10. This drive device 16 also can additionally serve the purpose of axially shifting or displacing the insulator rod 1 relative to the roll pair 3, 4.

As mentioned, the equipment of FIGS. 1 to 3 serves for the continuous and simultaneous forming of the shields 2 and the application of such shields at the insulator rod 1. With the apparatus of FIGS. 1 to 3 the shield-forming material 6 is in contact with the rolls 3 and 4 throughout a rotational angle α of, for instance, about 120°. Within this rotation angle α there is accomplished the forming or shaping of the shield or screen 2 from the material outfed through the infeed gap 5. Depending upon the condition or state of the shield-forming material 6 at the region of the infeed gap 5, the rolls 3 and 4, which are advantageously heated rolls, must be appropriately heated and the fabrication speed, in other words the rotational speed of the insulator rod 1 must be appropriately selected. Particularly suitable as a shield-forming material is silicon rubber which, following mixing of the ground or base mass and the addition of a suitable catalyst, must be brought between the aforementioned rolls 3 and 4 in the shield shape 2. If there is used as the shield-forming material "Silastic E", which is a silicon rubber available from Dow Corning Corporation, of Midland, Michigan, then the temperature of the heated rolls 3 and 4 should be in a range of 80° C. to 140° C. A variant possibility resides in the selection of a certain temperature within the previously mentioned temperature range and the selection of a certain peripheral speed at the insulator rod 1.

Figure 4:
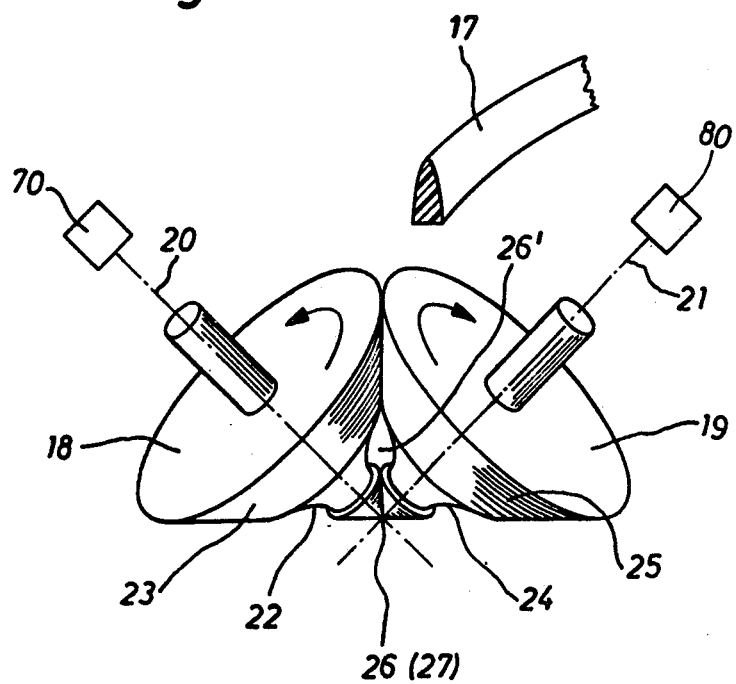
FIG. 4 is a perspective view illustrating a second exemplary embodiment of apparatus serving for forming a shield or screen rod, which then can be applied during a further separate working step by means of a not particularly illustrated device in order to form the shield at an insulator rod.

Continuing, with the equipment shown in FIG. 4 there is continuously fabricated in a simple manner a shield or screen rod 17 or the like. To this end there are provided two substantially conical-shaped rolls or rollers 18 and 19 which are driven by conventional and therefore simply schematically illustrated drives 70 and 80 so that these rolls 18 and 19 rotate in the direction of the indicated arrows about their lengthwise axes 20 and 21. The roll 18 is provided with a circumferential or peripheral groove 22 and also has an outer or jacket surface 23. The other roll 19 is also provided with a circumferential or peripheral groove 24 and likewise has an outer or jacket surface 25. These rolls 18 and 19 bear against one another at their outer or jacket surfaces 23 and 25, respectively, and both of the circumferential grooves 22 and 24 or equivalent structure form at the gap of the roll pair 18 and 19 a molding space or chamber 26' which essentially corresponds to the cross-sectional shape of the shield rod or bar 17. In this molding space or chamber 26' the rod 17 is continuously fabricated from a kneadable plastic material, like the material 6 previously disclosed in conjunction with the embodiment of FIGS. 1 to 3. The rolls 18 and 19 need not be of truncated conical configuration, like the rolls 3 and 4 of the first embodiment of FIG. 1, rather their apexes 26 and 27 lie upon the lengthwise axis of an imaginary insulation rod, which may be like the rod 1 of FIG. 1. Here also the rolls 18 and 19 are heated rolls.

The operation of the equipment shown in FIGS. 1 to 3, and thus, the continuous fabrication of a plastic insulator, proceeds in the following manner: The roll elements 3 and 4 which come into contact with the shield-forming material 6 must be accommodated to the surface of the shield or screen 2 which is to be shaped or formed and during the forming thereof must uniformly corotate therewith and without any mutual shifting, in other words they must roll-off of the material and not slide. Due to these requirements the dimensions and the rotational movement of the rollers 3 and 4 are determined. With the embodiment of FIGS. 1 to 3 the insulator rod 1 is rotated about its lengthwise axis 10 and at the same time is axially displaced with respect to both of the rolls 3 and 4, so that there occurs at the insulator rod 1 a helical-shaped application of the shield or screen 2 to such insulator rod 1. The relative axial movement of the insulator rod 1 with respect to the rolls 3 and 4 also can be accomplished in that, for instance, both of the rolls 3 and 4 are moved along the insulator rod 1. These rolls 3 and 4 are driven, as mentioned, in the indicated direction of rotation, and as a matter of convenience in illustration the bearing or support locations of the rolls 3 and 4 have been omitted, particularly since the same is conventional and totally unimportant for understanding the underlying principles and concepts of the invention. Depending upon the shape of the end surfaces or faces 8 of the rollers or rolls 3 and 4 there is formed the transition of the fabricated shield or screen 2 with respect to the outer surface 1a of the insulator rod 1. From the showing of FIG. 1 it will be seen that with the roof-shaped configuration of the end surfaces 8 of the rolls 3 and 4 the shield or screen 2 merges with the outer or jacket surface 1a of the insulator rod 1 at its lower region or foot with a wider base than such corresponds to the shield thickness. With an appropriate design at the end surface 8 it is therefore possible to obtain a covering or coating of the insulator rod 1 between the coils of the helical-shaped shield or screen 2. The rotational speed of the insulator rod 1 should amount to $n_o$. The insulator rod 1 has the radius R. The end surface 8 has the radius r. The rotational speed of the rolls 3 and 4 then can be expressed by $n_1 = n_o \cdot (R/r)$. The helix of the shield or screen 2 is then formed in the direction of the arrow 15 (FIG. 3).

The duration of reaction of the silicon mixture until final cross-linking in the elastomeric or rubber state decreases with increasing temperature. The heat transfer from the heated rolls 3 and 4 to the material mixture 6 is proportonal to the duration of contact between the rolls 3 and 4 and the material 6 as well as the temperature of the heated rolls 3 and 4. With a predetermined temperature of the rolls 3 and 4 the throughpass velocity of the material 6 through the rolls 3 and 4 can be increased with increase in the diameter of the rolls 3 and 4; this diameter of the rolls 3 and 4 is however limited with the construction of the equipment of FIGS. 1 to 3 by the insulator rod 1, since it will be recalled the apexes or tips 9 of the rolls 3 and 4, on the one hand, must be located essentially at the lengthwise axis 10 of the insulator rod 1 and, on the other hand, end surfaces 8 of the rolls only may extend up to the outer surface 1a of the insulator 1.

During the separate production of the shield or screen rod 17, as shown in FIG. 4, there is no longer limited, as was the case for the equipment of FIGS. 1 to 3, the angle between the roll axes 20 and 21 of the rolls 18 and 19, and in the extreme case can be enlarged to 90°. Between these revolving heated conical rolls 18 and 19 there is pressed into the mold space or chamber 26' the shield-forming material 6.

The shield rod 17 fabricated with the equipment of FIG. 4 is then wound in any suitable manner by means of a device appropriate for this purpose on to a insulating rod, such as the rod 1 of FIG. 1, during a continuous working operation and secured at such insulating rod. The separate fabrication of the shield or screen rod 17, according to the embodiment of FIG. 4, and which operation is separate from the winding and attachment of the formed shield rod 17 at the insulator rod 1, has the advantage that it is possible to also use for the shield rod also such types of insulating material which require for the forming or molding thereof extremely high temperatures at the heated rolls 18 and 19, since it is not necessary to take into account whether or not the insulator or insulating rod 1 is capable of withstanding these high temperatures without damage. The shield rod 17 fabricated with the equipment of FIG. 4 can have a random length. This shield rod 17 is then, as stated, wound at a suitable winding device onto the insulator rod 1 in a helical configuration and can be bonded thereto by means of a cold acting-silicon adhesive. The intermediate spaces between the shields or screens mounted at the insulator rod then can be covered with a suitable band, such as a glass filament band imbued in a silicon adhesive.

The following observations are applicable to both of the embodiments of apparatus shown in FIGS. 1 to 3 and 4: The temperature of the heated rolls 3, 4 and 18, 19, respectively, and the throughpass velocity of the material 6 must be coordinated to one another such that during the passage of the material 6 through the inlet or infeed gap 5 or the mold space or chamber 26 this material 6 is still plastically deformable, so that it can assume the desired shape of the shield cross-sectional profile and only following this location is cross-linking completed by the thermal action exerted by the outer surfaces. As mentioned, a particularly suitable material for fabricating the shields or screens is "Silastic E", which after mixing with a catalyst at room temperature assumes within 24 hours a rubber or elastomeric condition. Upon heating to 120° cross-linking already starts after a few seconds. This property of the material is beneficially employed in order to manufacture the shields with technically feasible production speeds in that the forming tools, i.e., the rolls 3, 4 and 18, 19 are heated to an appropriate temperature.

While there are shown and described present preferred embodiments of the invention, it is to be distinctly understood that the invention is not limited thereto, but may be otherwise variously embodied and practiced within the scope of the following claims.
ACCORDINGLY,

What is claimed is:

1. An apparatus for manufacturing a plastic insulator provided with substantially helical-shaped shields which radially protrude from an insulator rod, comprising:

two oppositely rotating substantially truncated conical-shaped rolls;

said rolls forming therebetween and the outer surface of a neighboring insulator rod an infeed gap for the infeed of a shield-forming material which is to be infed in kneadable condition in transverse direction with respect to the rolls;

said rolls being arranged at one side of the insulator rod and the imaginary cone apexes of the substantially truncated conical-shaped rolls being located essentially at the lengthwise axis of the insulator rod;

drive means for rotating the rolls about their roll axes and the insulator rod about its lengthwise axis;

means for imparting a relative movement between the pair of rolls and the insulator rod in the direction of the lengthwise axis of the insulator rod or essentially parallel thereto in order to simultaneously form the shield and to apply the shield to the insulator rod.

2. The apparatus as defined in claim 1, wherein:
   the lengthwise axes of the two rolls are located behind one another in the lengthwise extent of the insulator rod and converge in the direction of the lengthwise axis of the insulator rod.

3. The apparatus as defined in claim 1, wherein:
   said rolls comprise heated rolls.

4. The apparatus as defined in claim 1, wherein:
   said means for importing said relative movement constitutes part of said drive means.

* * * * *